United States Patent
Sreenivas et al.

(10) Patent No.: US 6,633,299 B1
(45) Date of Patent: Oct. 14, 2003

(54) METHOD AND APPARATUS FOR IMPLEMENTING SMART ALLOCATION POLICIES FOR A SMALL FRAME BUFFER CACHE SERVING 3D AND 2D STREAMS

(75) Inventors: Krishnan Sreenivas, Folsom, CA (US); Aditya Sreenivas, El Dorado Hills, CA (US); Tom Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/480,874

(22) Filed: Jan. 10, 2000

(51) Int. Cl.$^7$ ................................................. G09G 5/36
(52) U.S. Cl. ................... 345/557; 345/552; 345/530; 711/118; 711/119
(58) Field of Search ................... 711/122, 123, 711/129, 117, 145, 155, 135, 134, 136, 3, 227, 128, 141, 1, 154; 710/45; 707/205; 345/565, 441, 422, 557

(56) References Cited

U.S. PATENT DOCUMENTS

| | | | | |
|---|---|---|---|---|
| 5,537,570 A | * | 7/1996 | Tran | 711/128 |
| 5,805,854 A | * | 9/1998 | Shigeeda | 711/1 |
| 5,875,465 A | * | 2/1999 | Kilpatrick et al. | 711/134 |
| 6,038,645 A | * | 3/2000 | Nanda et al. | 711/141 |
| 6,173,367 B1 | * | 1/2001 | Alekesic et al. | 711/129 |
| 6,460,122 B1 | * | 10/2002 | Otterness et al. | 711/154 |
| 6,498,605 B2 | * | 12/2002 | Abdallah | 345/422 |

* cited by examiner

Primary Examiner—Matthew C. Bella
Assistant Examiner—Dalip Singh
(74) Attorney, Agent, or Firm—Blakely, Sokoloff, Taylor & Zafman LLP

(57) ABSTRACT

In one embodiment, the invention is a method. The method includes monitoring a data stream. The method also includes partitioning a cache into two sub-caches based on monitoring the data stream.

28 Claims, 11 Drawing Sheets

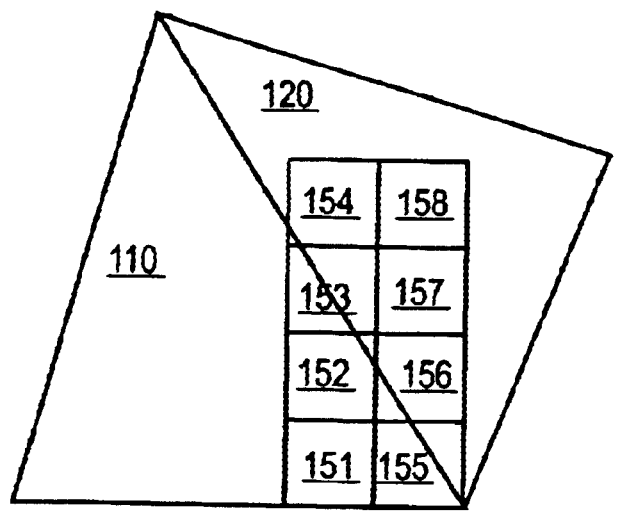
FIG. 1C
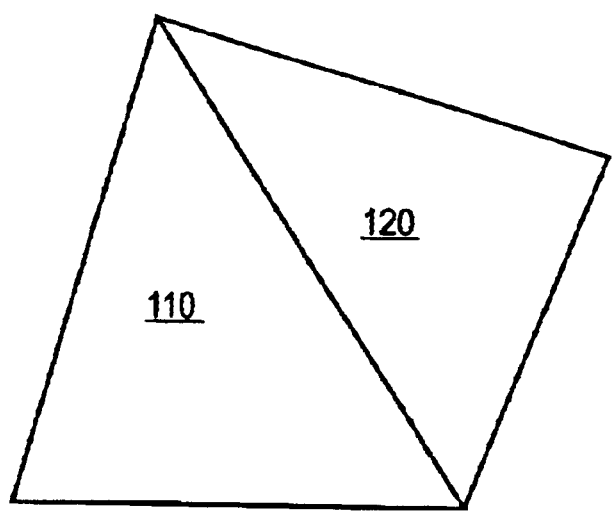
FIG. 1A
FIG. 1B

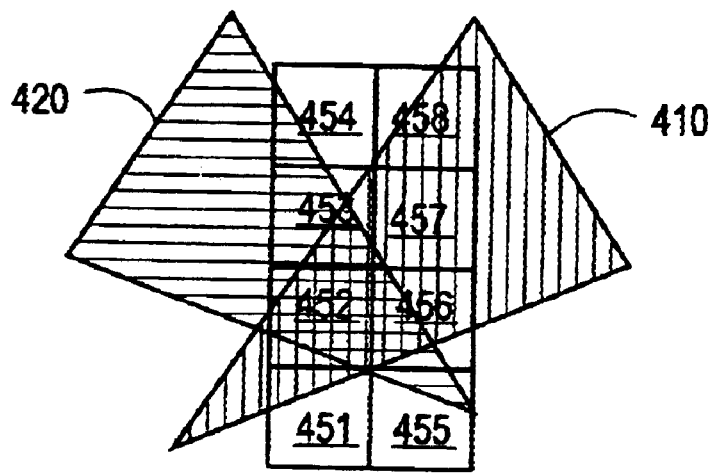
FIG. 4C
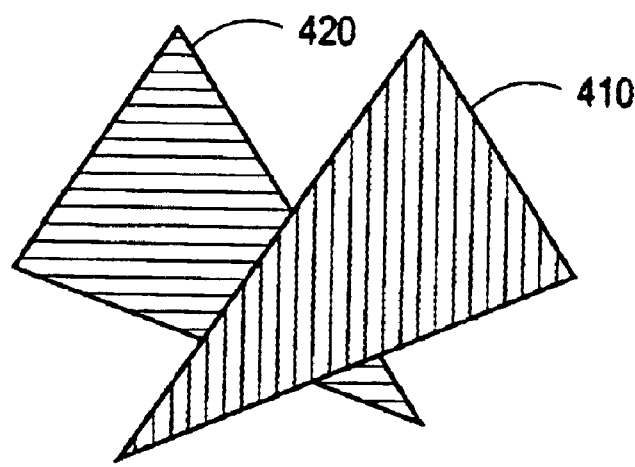
FIG. 4A
FIG. 4B

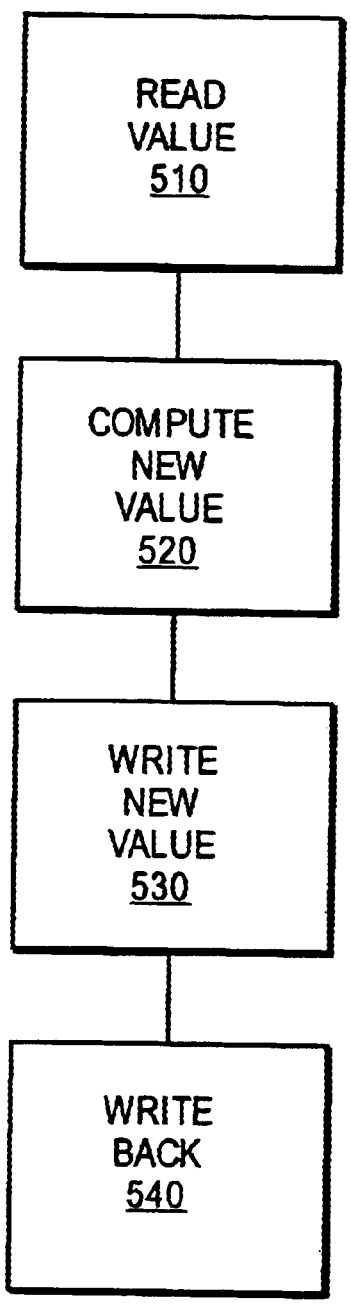
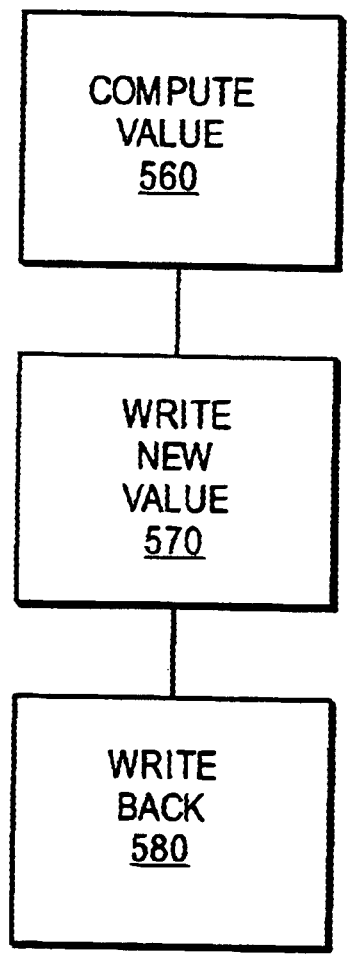
FIG. 5A
FIG. 5B

METHOD AND APPARATUS FOR IMPLEMENTING SMART ALLOCATION POLICIES FOR A SMALL FRAME BUFFER CACHE SERVING 3D AND 2D STREAMS

BACKGROUND OF THE INVENTION

1. Field of the Invention

The invention generally relates to cache management and graphics data processing and more specifically relates to managing a cache utilized for processing graphics data.

2. Description of the Related Art

Computer systems have long used cache memory to store information which the processor is likely to attempt to access again soon. It is well known that if information will be used again, it is likely to be used again by a computer soon after it is initially used. While this is certainly not an absolute condition, it is a well-accepted rule of thumb. Caches are typically organized as a set of entries or cache lines and a corresponding set of tags. When a piece of information is requested from memory, the address at which the information is stored is compared with the tags in the cache. If a hit (comparison where a tag matches the address) occurs, the entry corresponding to the tag is retrieved. If a miss occurs, the request proceeds to memory (or continues at memory in parallel). Caches may be fully associative, in which the tag identifies a single entry, or may be set-associative, in which the tag identifies a set of entries, one entry of which will likely correspond to the part of the set of entries sought when a match occurs.

More recently, graphics systems have used caches for a similar purpose, storing graphics data that is likely to be used again soon. However, efficient use of caches for graphics data is an area that has yet to be seriously developed.

Typically, graphics systems render 3D objects using triangles, perform transformations, blend multiple sources of graphics data to a single picture, or display 2D images. To do this, the graphics system reads data (typically pixels) from a memory and stores the data into the cache. Then, if the data is needed again soon, the data may be accessed from the cache. Alternatively, if the data is not needed again soon, it is typically flushed from the cache so that more recently accessed data may be stored in the cache. The data is typically flushed from any cache in an LRU (least recently used) order, such that the entries in the cache (the cache lines) that have been stored there the longest are replaced first.

SUMMARY OF THE INVENTION

In one embodiment, the invention is a method. The method includes monitoring a data stream. The method also includes partitioning a cache into two sub-caches based on monitoring the data stream.

BRIEF DESCRIPTION OF THE DRAWINGS

The present invention is illustrated by way of example and not limitation in the accompanying figures.

FIG. 1A illustrates an embodiment of two triangles which may be rendered for a three dimensional graphics display.

FIG. 1B illustrates a set of eight spans or 4×4 pixel blocks used for rendering graphics data.

FIG. 1C illustrates superposition of the items illustrated in FIGS. 1A and 1B.

FIG. 4A illustrates an embodiment of two overlapping triangles to be rendered.

FIG. 4B illustrates a set of eight spans or 4×4 pixel blocks used for rendering graphics data.

FIG. 4C illustrates superposition of the items illustrated in FIGS. 4A and 4B.

FIG. 5A illustrates an embodiment of a process of using a read-allocated value.

FIG. 5B illustrates an embodiment of a process of using a write-allocated value.

DETAILED DESCRIPTION

Figure 2A:
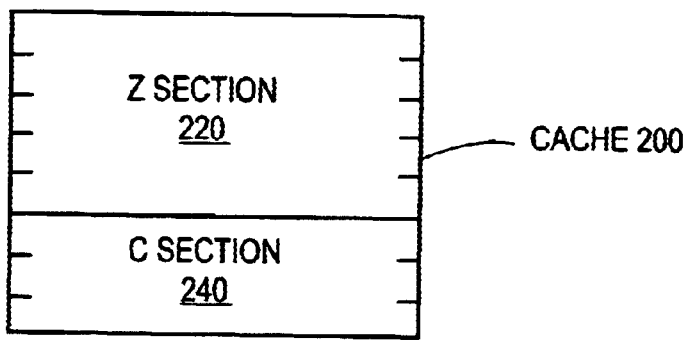
FIG. 2A illustrates a first embodiment of a partition of a cache.

A method and apparatus for implementing smart allocation policies for a small frame buffer cache serving 3D (three dimensional) and 2D (two dimensional) streams is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

FIG. 1A illustrates two triangles which may be rendered for a three dimensional or two dimensional graphics display. Triangle 110 and triangle 120 share an edge, and each contain a number of pixels. In one embodiment, boundaries of triangles may cross through pixels such that a pixel may be contained in more than one triangle. Alternatively, in other embodiments, triangles may contain only whole pixels.

In one embodiment, each pixel has associated with it a depth (Z) value and a color (C) value. Alternatively, the pixel may also have a texture value associated with it, among other attributes. Each time a triangle is drawn on a display, some or all of the values associated with each pixel in the triangle must be accessed to calculate the values for the pixels actually displayed.

FIG. 1B illustrates a set of eight spans or 4×4 pixel blocks used for rendering graphics data. In one embodiment of a graphics system, 4×4 pixel blocks are used for processing, thus allowing the graphics system to process data either in parallel, or to minimize accesses to memory. Thus, the spans are accessed by reading all sixteen sets of pixel values contained therein before the span is processed. It will be appreciated that a different size or shape of pixels may be used for graphics processing within the spirit and scope of the invention.

Spans 151, 152, 153, 154, 155, 156, 157, and 158 are illustrated as organized in two columns of four spans each. It will be appreciated that this organization is arbitrary and may be altered within the spirit and scope of the invention. Moreover, the order in which these spans are processed does not necessarily contribute to the invention. However, spans will typically be processed such that a span is processed before an adjacent span and after another adjacent span if possible, both because this organization is easy for system designers to understand and because this lends itself to processing items in adjacent memory locations at similar times.

FIG. 1C illustrates superposition of the items illustrated in FIGS. 1A and 1B. It will be appreciated that all of the pixels of spans 154, 157 and 158 are contained within triangle 120. Likewise, all of the pixels of span 151 are contained within triangle 110. Spans 152, 153, 155 and 156 have pixels in each of triangles 110 and 120. Pixels lying along the boundary between triangle 110 and triangle 120 may require calculations taking into account the properties of both triangle 110 and triangle 120, such as blending of colors or textures. Likewise, when triangle 110 is processed (rendered) span 151 may be completely processed, but spans 152, 153, 155 and 156 may only be partially processed. In one embodiment, all spans touched by a triangle (having at least one pixel contained partially within the triangle) are rendered to the extent the span can be rendered. Then, when the second triangle is rendered, the rest of the span is rendered.

While it will be appreciated that more than two triangles can touch a span, this has been shown empirically to be a relatively unusual occurrence, such that memory management and cache management may rely on a span only being touched by two triangles much as system memory management relies on memory typically being accessed soon after it is first accessed.

FIG. 2A illustrates a first embodiment of a partition of a cache. In this embodiment, the cache 200 is partitioned into a Z-portion 220 and a C-portion 240, for depth and color attributes of a pixel. The cache is partitioned into two unequally sized portions, with the Z-portion 220 being larger. In one embodiment, cache 200 has 16 entries, of which 10 are in the Z-portion 220 and 6 are in the C-portion 240.

Figure 2B:
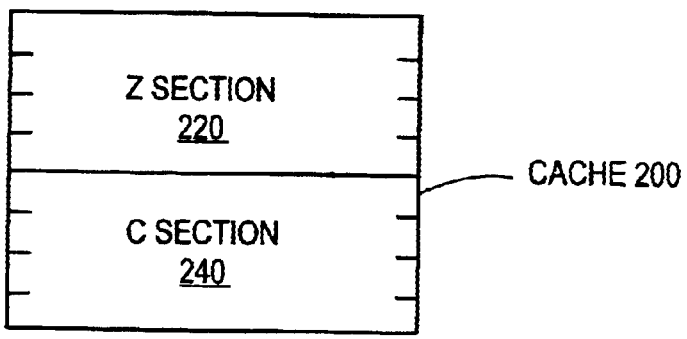
FIG. 2B illustrates a second embodiment of a partition of a cache.
Figure 2C:
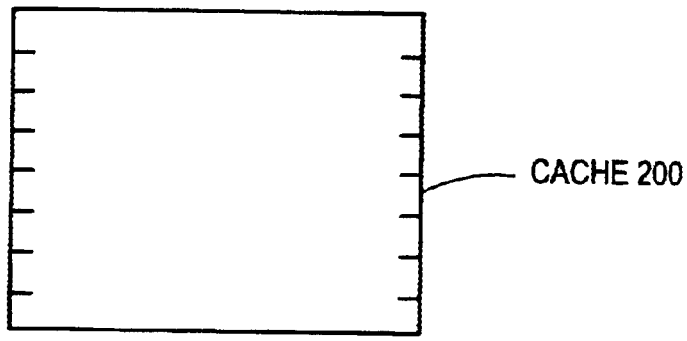
FIG. 2C illustrates a third embodiment of a partition of a cache.

Alternatively, FIG. 2B illustrates a second embodiment of a partition of a cache. In this embodiment, Z-portion 220 and C-portion 240 each have the same size. In one embodiment, Z-portion 220 has 8 entries of the 16 entries in the cache 200. In another alternative, FIG. 2C illustrates a third embodiment of a partition of a cache. In this instance, the cache is not partitioned, and is said to be unified.

The three different partitioning schemes may all be used with the same cache, and each may be suitable for particular situations. For example, when triangles are rendered without blending, the depth portions of a pixel are often calculated based on the values stored for the pixel prior to calculation and for each triangle-associated with a pixel. If the pixel is in front of the triangle already (depth less than the triangle), then the pixel is unchanged, and otherwise it is overwritten in accordance with the triangle. In the same situation, the color value need not be read in to determine whether it needs to be changed, as the color is changed when the depth indicates the triangle being rendered overrides the pixel value. As a result, the color associated with the pixel only resides in the cache for purposes of writing, whereas the depth associated with the pixel resides in the cache from the time it is read for comparison purposes until it is written. This results in the depth values residing in the cache for a longer period of time than the color values, and it may be advantageous to partition the cache such that the depth values have more entries than the color values.

Alternatively, when the background is painted on a 3D picture in one embodiment, both depth and color values are written irrespective of the original pixel values. As a result, both depth and color values reside in the cache for similar amounts of time (for writing purposes only), and dividing the cache evenly may be advantageous. Furthermore, some operations (for example stretch blitter operations or motion compensation operations) do not distinguish between the two types of values, and therefore a unified cache may be advantageous. Likewise, when 2D pictures are displayed, the data stream often has source and destination components, without a depth component for either. However, the source and destination may overlap, so using a unified cache may be advantageous.

Figure 3:
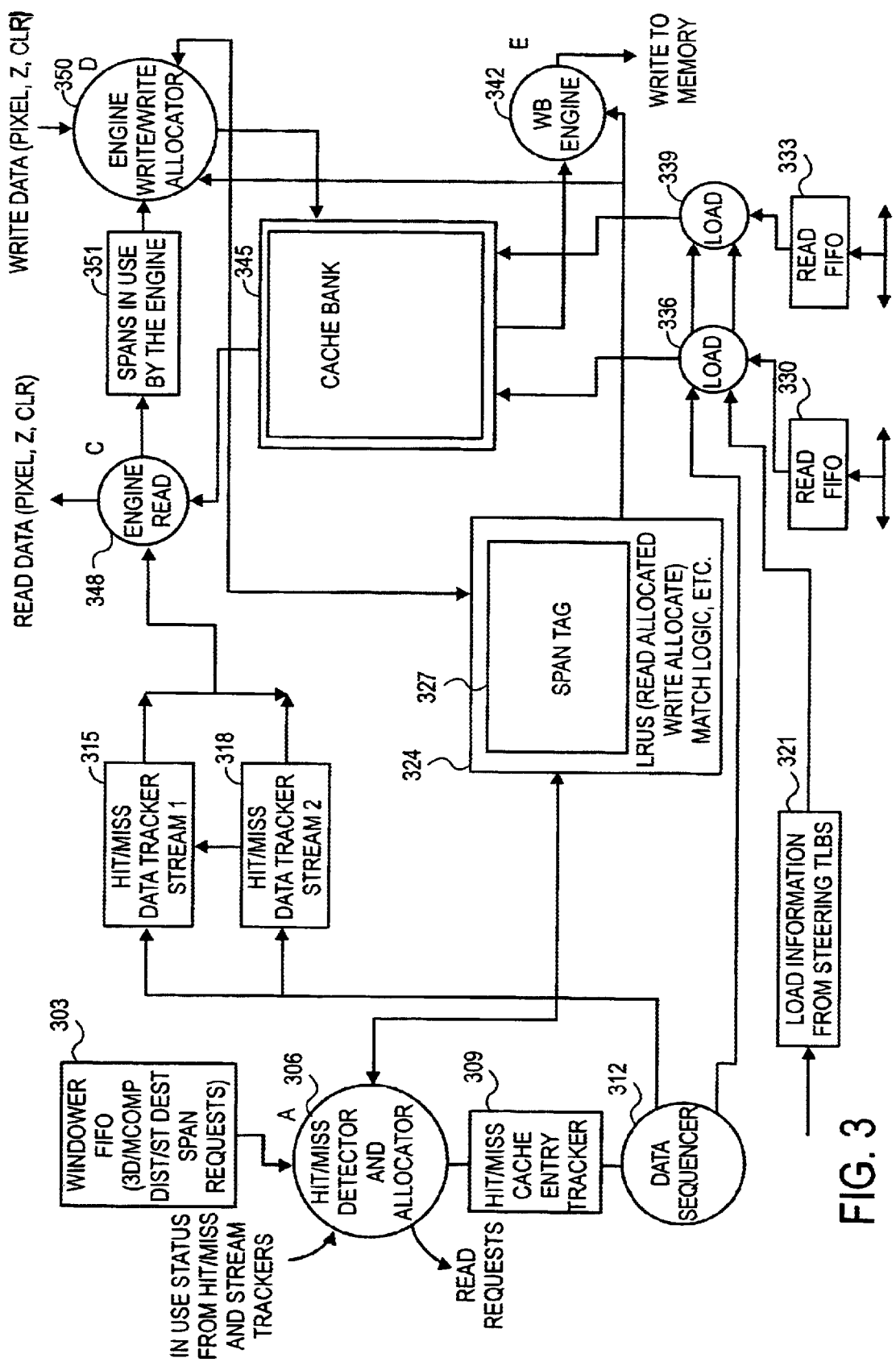
FIG. 3 illustrates an embodiment of a cache and associated control logic and/or control routines.

FIG. 3 illustrates an embodiment of a cache and associated control logic and/or control routines. Windower FIFO 303 stores a queue of requests to render or process spans. Hit/miss detector 306 determines whether the span from the windower FIFO 303 is a hit or a miss in cache 345 by comparing the address of the span to the addresses in span tags 327 through use of cache logic 324 (particularly the match logic portion). On a miss, a read request is sent beyond the cache, typically to either graphics memory or main memory in one embodiment. Tracker 309 keeps track of cache hits and misses from hit/miss detector 306, thereby determining whether data is available and whether the cache needs to be scrubbed. Data Sequencer 312 in turn utilizes the information from tracker 309 to determine which span the engine (typically the bitblt engine in one embodiment) should process next, as spans having a cache hit may be processed immediately whereas other spans may be delayed in coming from other memory. Load stages 336 and 339 load data from the read fifos 330 and 333 in response to control signals from data sequencer 312. In one embodiment, read fifo 330 may be allocated to depth information while read fifo 333 may be allocated to color information. However, it will be appreciated that read fifos 330 and 333 may be interchangeable, or may be allocated to any form of data, particularly when the cache is in a unified mode. Load stages 336 and 339 may also load from the tlbs 321 (translation lookaside buffers) as appropriate. Data loaded into load stages 336 and 339 is transferred to the cache 345 for storage and retrieval by the engine. Data sequencer 312 also sends information to data trackers 315 and 318, which determine which spans from the two streams are actually accessible in the cache 345 and thereby determine which spans the engine should read through engine read stage 348. Spans read by the engine go from engine read stage 348 to spans in use 351, and then to engine write stage 354. At engine write stage 354 (stage 354), a comparison is made between the address to be written to for the span and the tags in span tags 327, thereby determining whether the span is in the cache 345 or not. If the span is in the cache 345, the write is done to the cache 345. If the span is not in the cache 345, space is allocated in the cache 345, and then the write is done to the cache 345. Finally, spans that have been written to within the cache are sent to the writeback engine 342 under control of scrubbing logic (not shown) and the LRU status information maintained as part of cache logic 324. Writeback engine 342, in one embodiment, writes four spans at a time to memory, thus freeing up four entries and also efficiently utilizing bandwidth available for transfers to memory.

FIG. 4A illustrates an embodiment of two overlapping triangles to be rendered. Triangle 410 is at a first depth and has a first color. Triangle 420 is at a second depth and has a second color. As illustrated, triangle 410 is on top of triangle 420, such that where the triangles overlap, only triangle 410 is displayed. FIG. 4B illustrates a set of eight spans or 4×4 pixel blocks used for rendering graphics data. The eight spans 451, 452, 453, 454, 455, 456, 457 and 458 each are 4×4 blocks contained in the general area where triangles 410 and 420 appear. FIG. 4C illustrates superposition of the items illustrated in FIGS. 4A and 4B. Note that spans 451, 452, 453, 455 and 456 are covered by parts of both triangles, whereas span 454 is only covered by triangle 420 and spans 457 and 458 are only covered by triangle 410.

When this set of triangles is rendered without blending, the depth of pixels covered by triangle 420 may be read, and then the color may be generated by reference to the color of triangle 420. Then, when triangle 410 is rendered, the pixels covered by triangle 420 may have their depth read again, at which point it will become apparent that triangle 420 has no effect on the color of those pixels. Alternatively, triangle 410 may be rendered, with the depth and color for pixels set appropriately, then, when triangle 420 is rendered, the pixels covered by triangle 410 will be found to have a depth indicating that triangle 420 has no effect on those pixels.

FIG. 5A illustrates an embodiment of a process of using a read-allocated value. At block 510, a value is read from its original location for processing, in one embodiment it is read into a cache and then from there into the processor or engine. At block 520, a new value is computed based on the value read and other aspects of the current processor state. At block 530 the new value is written to the cache, and at block 540, the new value is written back from the cache to its original location.

Likewise, FIG. 5B illustrates an embodiment of a process of using a write-allocated value. At block 560, a value is computed based on the current processor state (including other values read for the computation). At block 570, the value is written to the cache, and at block 580 the value is written to its destination. Unlike the situation for read-allocated processing, a write-allocated value does not depend on the value originally in the location which is the ultimate destination for the value.

As was mentioned previously, read allocation is appropriate when the value written to memory may depend on the value already in memory, in which case the value must be read prior to processing and then written after processing if it changes. One embodiment uses read allocation when computing depth values during rendering of 3D objects without blending. Write allocation is appropriate when the value written to memory does not depend on the value already in memory, such as painting a background where the values will be set to values regardless of what is in memory, or writing color values when rendering 3D objects without blending.

Figure 6:
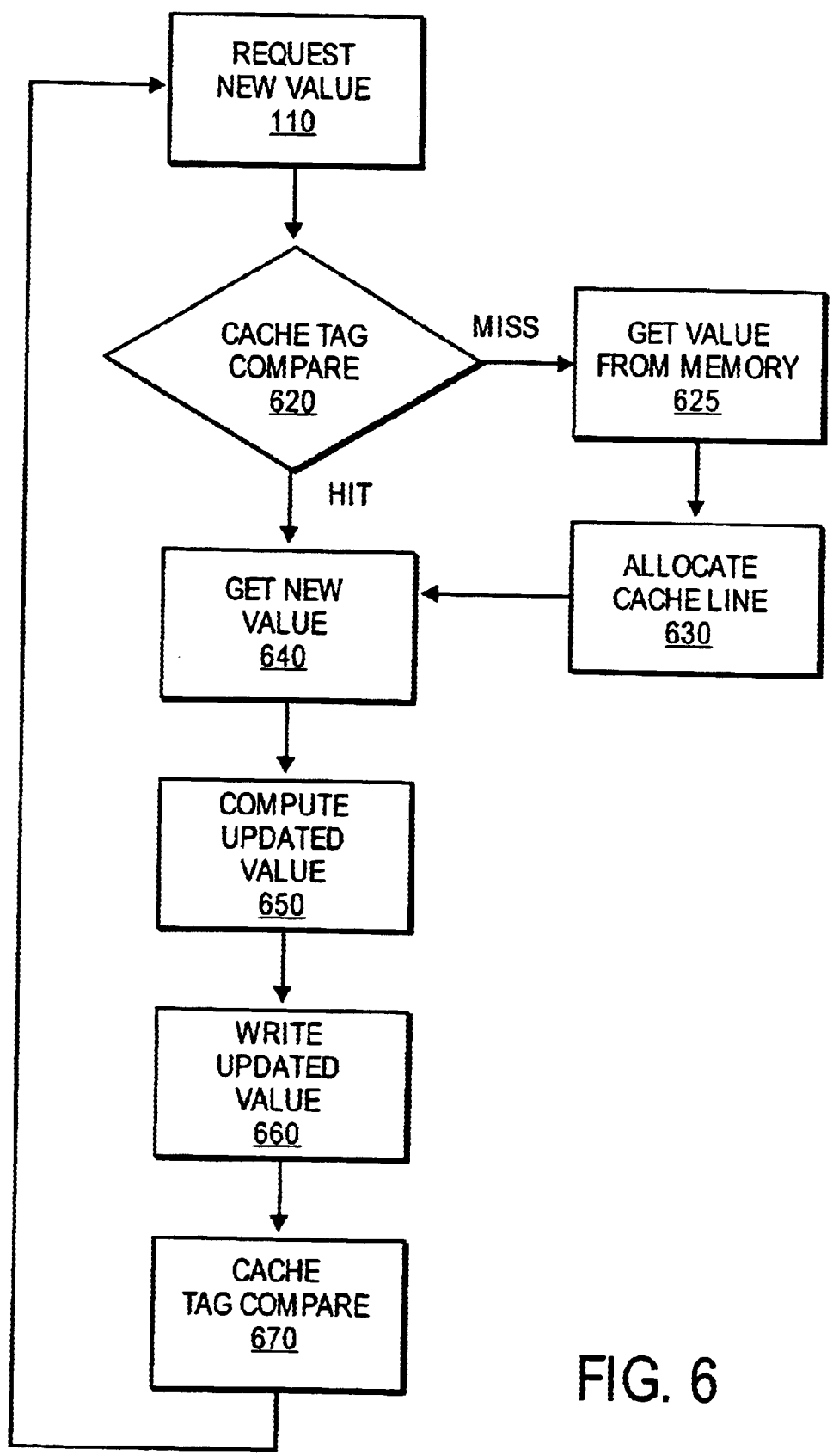
FIG. 6 illustrates an alternate embodiment of a process of using a read-allocated value.

FIG. 6 illustrates an alternate embodiment of a process of using a read-allocated value. At block 610, a new value is requested, such as when the windowing engine initiates processing of a new span. At block 620, the address of the value is compared to tags in the cache. If a miss results, the value does not match any of the tags, then the process proceeds to block 625 and the value is fetched from the address in memory. Additionally, the process proceeds to block 630, and an entry in the cache is allocated for the value. The process then proceeds to block 640, which is also where the process would go for a cache hit in block 620. At block 640, the process gets the new value from the cache and presents it for processing. At block 650, the updated value is computed, and at block 660, any changed value is written. This leads to block 670, where the memory location of the written value is compared with the cache tags. Since the value came from the cache, it should still be allocated an entry in the cache, and is therefore written to the cache. Not shown is the additional write back from the cache to memory such as system memory or a dedicated frame buffer.

Figure 7:
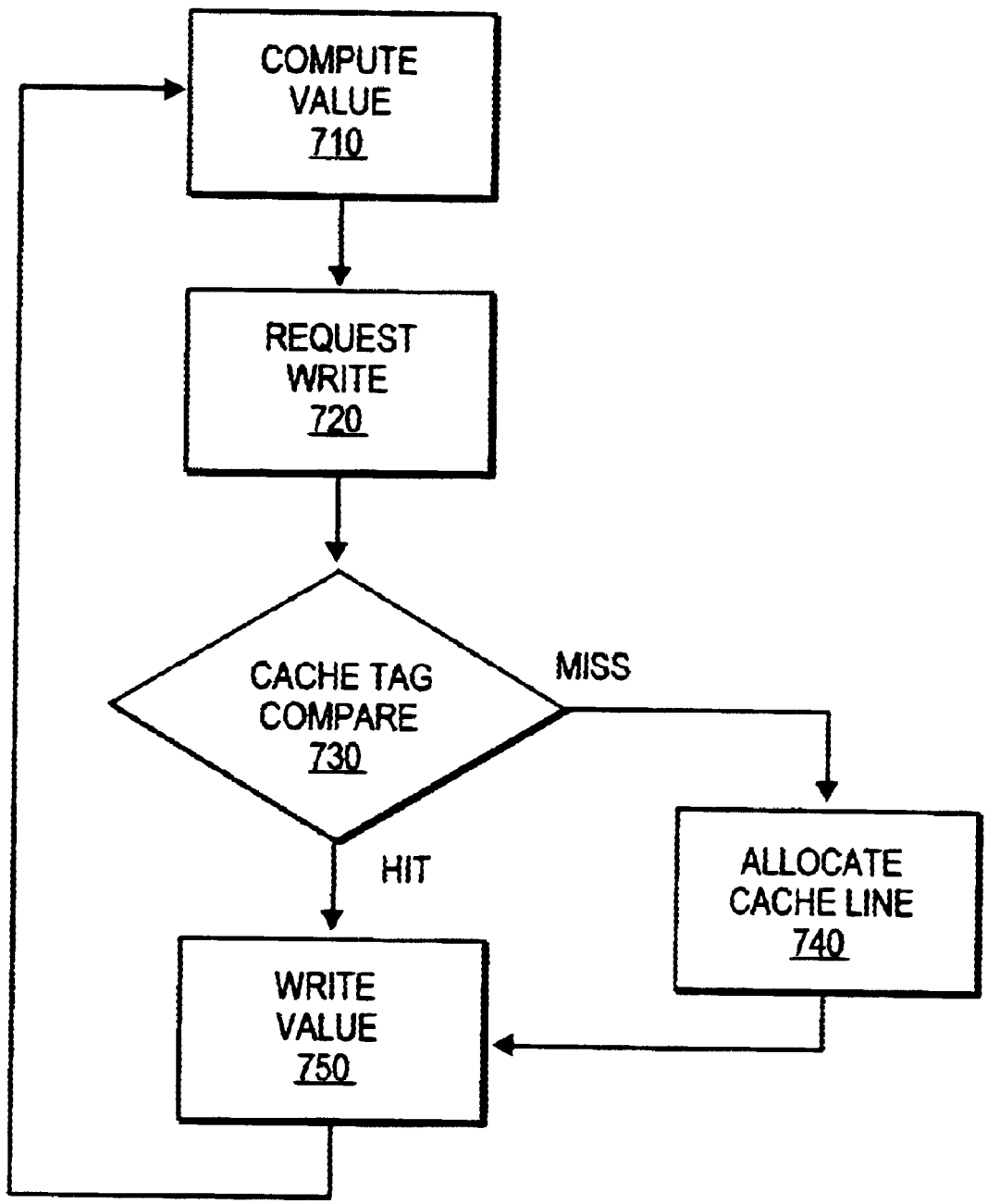
FIG. 7 illustrates an alternate embodiment of a process of using a write-allocated value.

FIG. 7 illustrates an alternate embodiment of a process of using a write-allocated value. At block 710, the value to be written is calculated. At block 720, a request for a write is made, leading to block 730. At block 730, the address of the write request is compared with the tags of the entries in the cache. If a miss results, the process flows to block 740 and a cache line is allocated. The process then flows to block 750, where the process would have gone from block 730 in the event of a hit. At block 750, the value is written to the cache. Not shown is the eventual writeback from the cache to main memory or the frame buffer among other locations.

Figure 8:
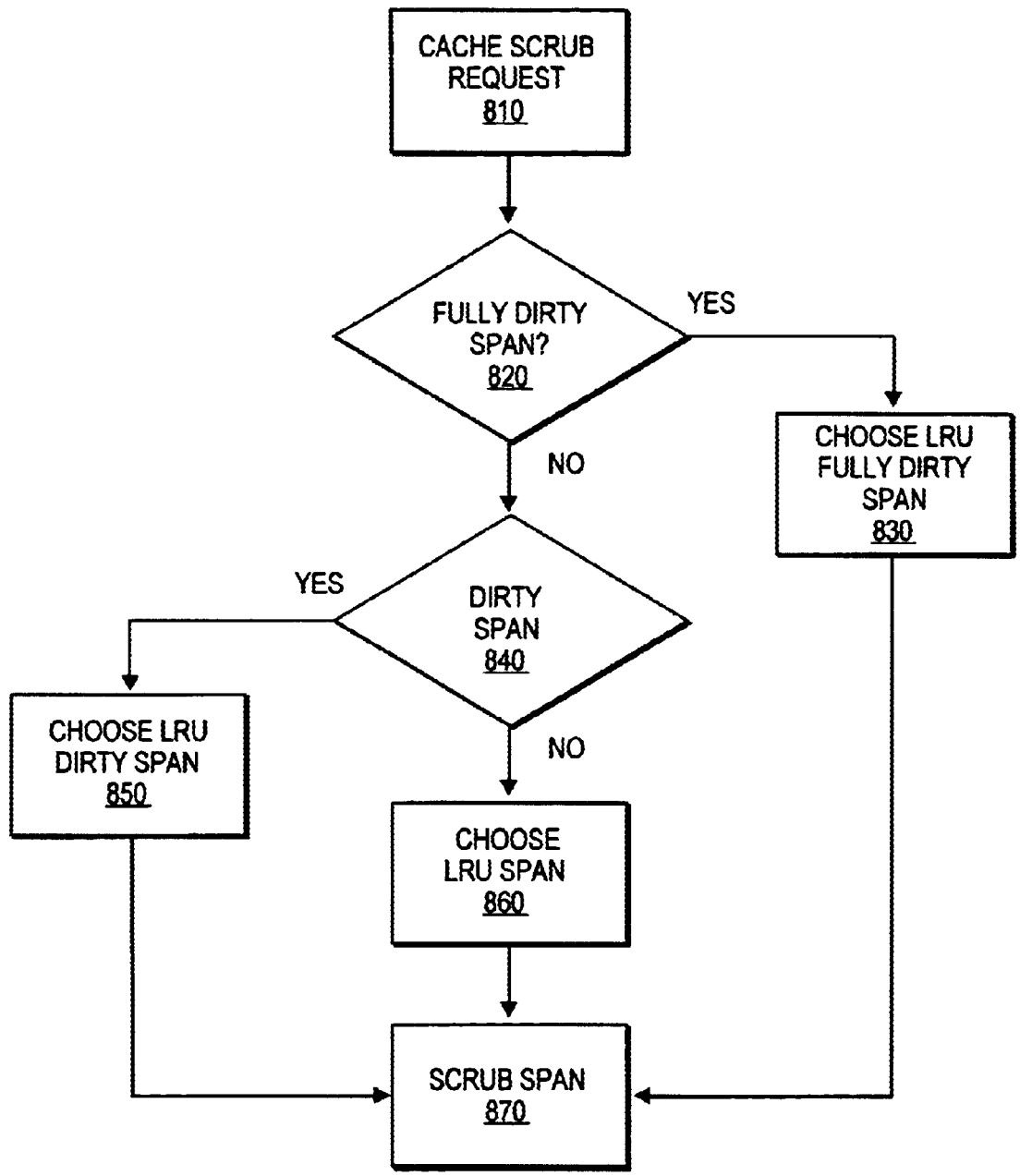
FIG. 8 illustrates an embodiment of a process of scrubbing a cache.

FIG. 8 illustrates an embodiment of a process of scrubbing a cache. At block 810, a cache scrub request occurs. This may occur on a periodic basis, or it may occur as a result of a scarcity of available entries in the cache in alternate embodiments. The process flows to block 820, where fully dirty spans are checked for. In some embodiments of a cache, the cache entries have associated a valid bit, a dirty bit, and a fully dirty bit. Fully dirty spans are said to be fully dirty when their fully dirty bit is asserted. A clean span is one that has never been written to since it was originally written to the cache in response to a request from memory. A dirty span is a span which has been written to once but has not had all of its pixels written to. Because of the nature of graphics processing, there is a good chance that there will be another write to a dirty span. A fully dirty span is a span that has been written to twice or that has had all of its pixels written to in one write. Because of the nature of graphics processing, there is a good chance that there will be another write to a dirty span, thus making it a fully dirty span, but that there will not be another write to a fully dirty span Cache logic also maintains a queue indicating which cache entries were least recently used. Thus, checking for fully dirty spans leads to finding spans least likely to be written to or otherwise accessed in the cache again.

If such a fully dirty span is found, the process branches to block 830, and the least recently used of the fully dirty spans is found. The process then branches to block 870, where the span is scrubbed, which is to say it is written back to memory and its entry is marked as invalid or unused within the cache. If no fully dirty spans exist, the process branches to block 840, where dirty spans are checked for. If dirty spans are found, the process branches to block 850, where the least recently used among the dirty spans is found (the LRU dirty span). The process then branches to block 870 and the LRU dirty span is scrubbed. If no dirty spans are found, the least recently used span is found at block 860, and scrubbed at block 870.

Figure 9A:
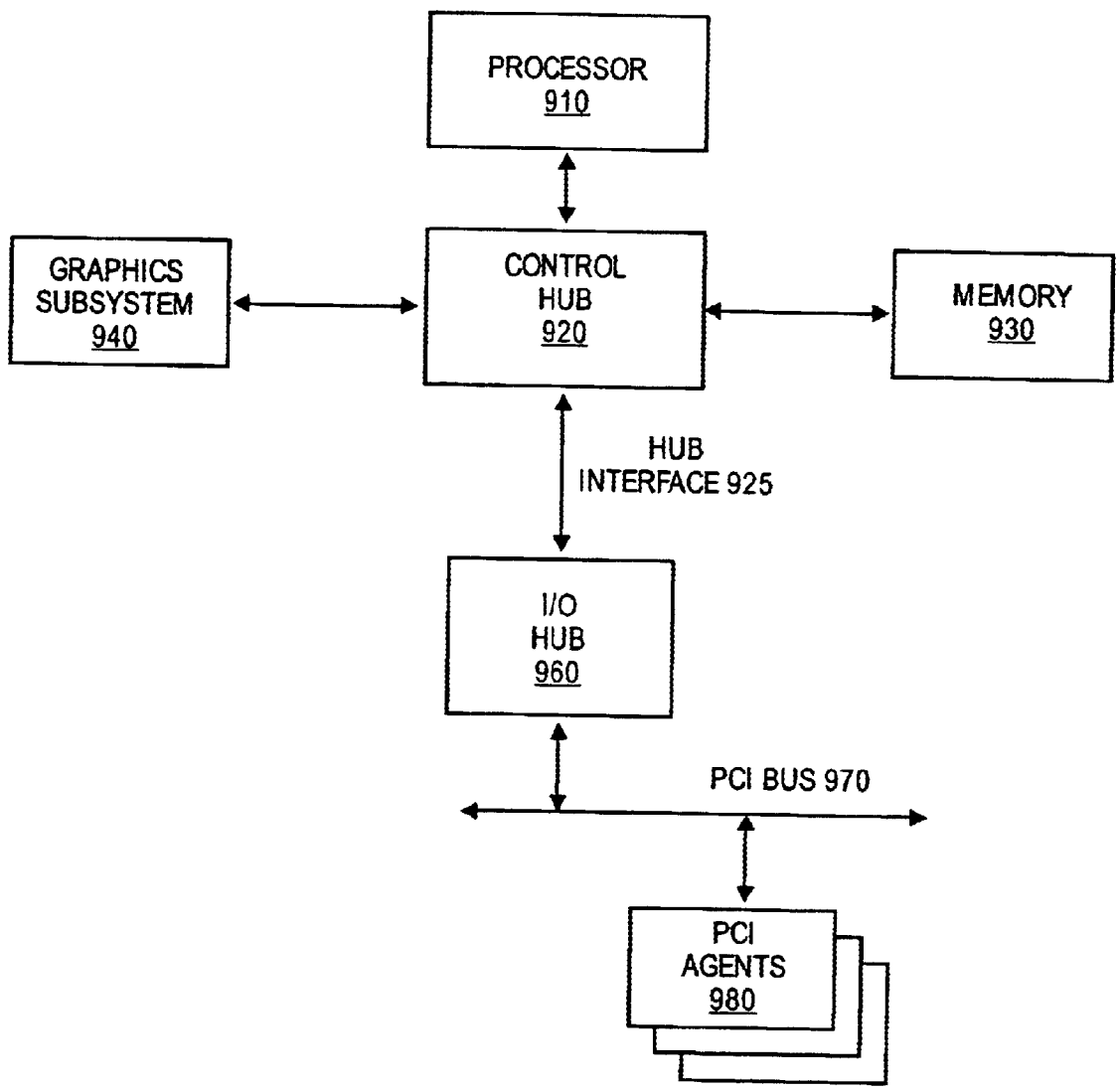
FIG. 9A illustrates an embodiment of a system in which a cache serving two types of graphics data may be used.

FIG. 9A illustrates an embodiment of a system in which a cache serving two types of graphics data may be used. Processor 910 is coupled to control hub 920. Control hub 920 is coupled to memory 930, to hub interface 925 and to graphics subsystem 940. Hub interface 925 is coupled to input/output hub (i/o hub) 960. I/O hub 960 is coupled to PCI Bus 970 and PCI Bus 970 is coupled to PCI agents 980. (PCI Bus 970 may in one embodiment be a Peripheral Component Interconnect Bus based on the Peripheral Component Interconnect Bus Specification Revision 2.1 or 2.2 from the Portland PCI Working Group as published by Intel Corporation.)

In one embodiment, a cache is included in the graphics subsystem 940 in accordance with the invention, but it will be appreciated that other caches and cache-like apparatuses may be utilized within the spirit and scope of the present invention. In one embodiment, responsive to the processor 910, the control hub 920 controls the flow of data between the processor 910, the memory 930, the graphics subsystem 940 and the I/O hub 960. Furthermore, in one embodiment, the control hub 920 is coupled to the memory 930 through a 64-bit datapath, making it possible to transmit one quadword of data (4 16-bit words) in a single data transmission cycle.

Figure 9B:
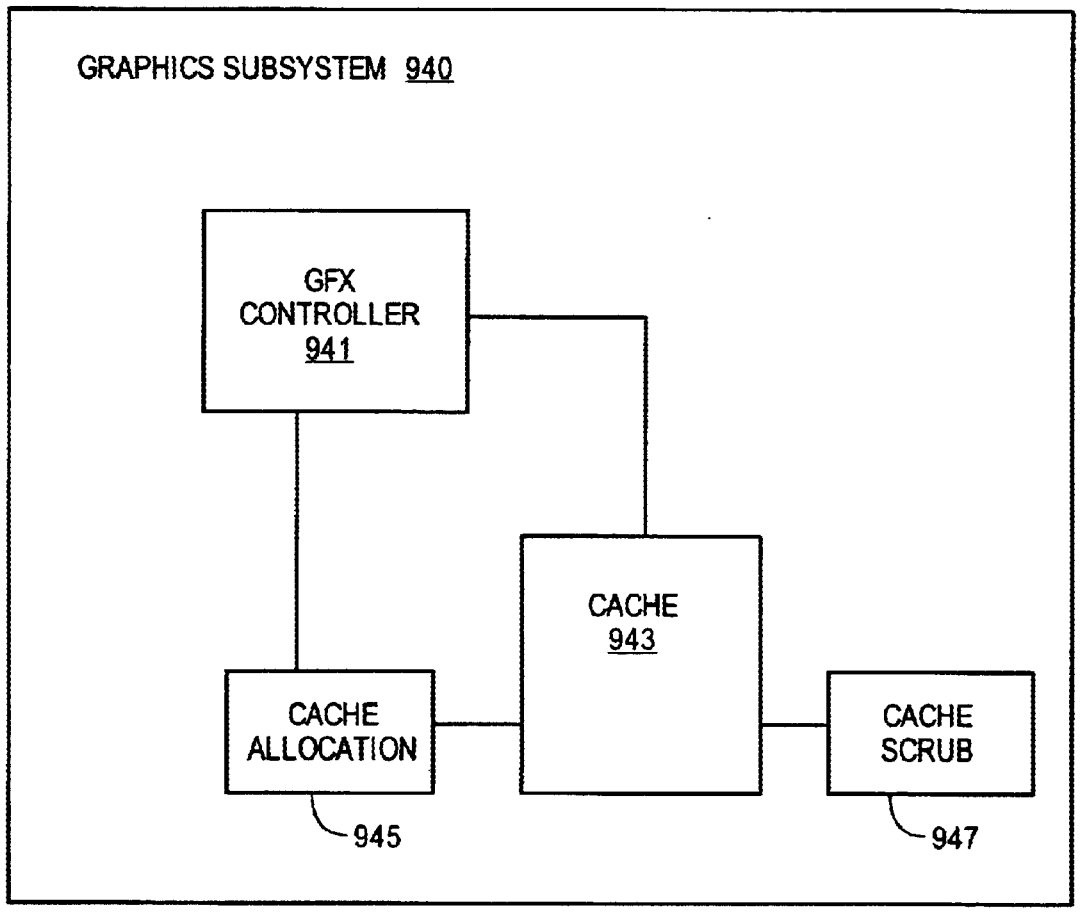
FIG. 9B illustrates a graphics subsystem in which a cache serving two types of graphics data may be used.

FIG. 9B illustrates a graphics subsystem in which a cache serving two types of graphics data may be used. Graphics controller 941 is coupled to both cache allocation logic 945 and cache 943. Cache allocation logic 945 is also coupled to cache 943, and cache 943 is also coupled to cache scrub logic 947.

In one embodiment, cache 943 contains both cache entries and corresponding cache tags for each entry. In one embodiment, cache allocation logic 945 may contain logic suitable for tracking an ordered list of least recently used (LRU) cache entries, and two or more separate lists may be maintained when the cache is apportioned as two or more separate sub-caches (when the cache is partitioned). Likewise, cache allocation logic 945 may contain logic suitable for maintaining information about which entries are allocated to which of two or more sub-caches or partitions.

Cache scrub logic 947 may contain logic suitable for interpreting requests to the cache for scrubbing or for detecting conditions indicating that an entry or entries of the cache should be scrubbed, such as a large number of invalid entries, or a small number of available entries (or zero availability) for example. Cache scrub logic 947 may also contain logic suitable for causing a writeback of an entry or entries to memory or other storage locations. In one embodiment, cache scrub logic causes a group of four entries to be written back each time the cache is scrubbed, thereby efficiently utilizing the connection between the graphics subsystem and the rest of the system and allowing the cache to operate without an overwhelming delay when scrubbing occurs. As will be appreciated, scrubbing one entry or line at a time would often result in scrubbing occurring each time a cache entry is allocated, and scrubbing the entire cache would result in a long period of time when the cache was completely inaccessible.

In one embodiment, cache 943 has sixteen entries or cache lines, each capable of holding four quadwords (four 16-bit words) of data. As a result, each entry may hold the depth or color data for one span or 4×4 pixel area if sixteen-bit pixels are used. That is, a sixteen-bit depth value for each of sixteen pixels may be held in one entry, or a sixteen-bit color value for each of sixteen pixels may be held in one entry. When the cache is scrubbed, four entries are scrubbed at a time, starting with the fully dirty spans in LRU order, and proceeding if necessary to the dirty spans in LRU order, finally proceeding if necessary to the clean spans in LRU order. Note that an unmodified entry is not written back, it would merely be invalidated such that it may be written over, and entries are not necessarily written back or invalidated serially. Scrubbing four entries at one time has been found to be efficient because it has a low incidence of causing page breaks during the scrub operation (having the entries fall into two or more pages) while freeing up enough space in the cache to allow for new entries.

It will be appreciated that the cache may be used to hold other information, such as pixels using eight bits of data for each value, or using texture values. Likewise, the size of each entry may be changed from the four quadword size, and the number of entries in the cache may be changed. Furthermore, the number of entries scrubbed may be changed as appropriate to the system in which the cache is utilized.

Additionally, the cache may be apportioned to hold ten depth (Z) entries and six color (C) entries at one time in a first mode. In a second mode the cache may be apportioned to hold eight Z entries and eight C entries. In a third mode, the cache may be apportioned to hold sixteen entries of indeterminate type. Switching between the three modes may either be accomplished by a sudden flush of the cache and switch to the new mode or by a gradual shift of the cache such as moving from a combination eight and eight Z and C entries respectively to 9 Z and 7 C entries and then to 10 Z and 6 C entries for example. Such shifts in modes may be accomplished in response to external signals (from the graphics controller 941 for example) or in response to monitoring of the data stream received by the graphics subsystem 940 and analysis of such data.

Figure 10:
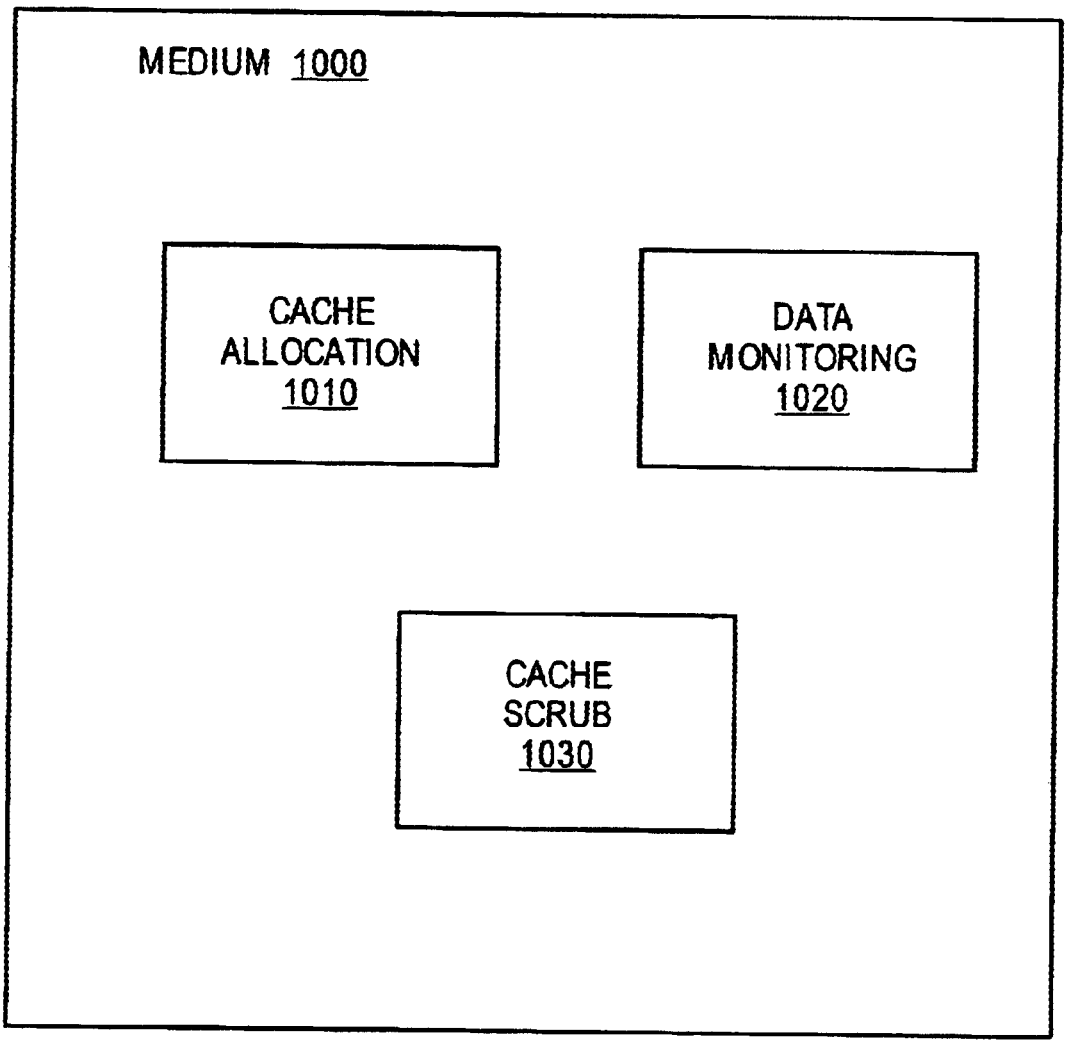
FIG. 10 illustrates a medium embodying instructions which when executed by a processor cause the processor to perform a method of managing a cache serving two types of graphics data may be used.

FIG. 10 illustrates a medium embodying instructions which when executed by a processor cause the processor to perform a method of managing a cache serving two types of graphics data may be used. Medium 1000 embodies instructions making up cache allocation 1010, data monitor 1020 and cache scrubber 1030 and may embody other instructions. It will be appreciated that each portion of medium 1000 may share instructions with other portions of medium 1000, and that the actual instructions may be distributed across multiple media. Furthermore, it will be appreciated that a medium may be a machine readable medium such as a magnetic tape or disk, an optical medium such as an optical disk, a carrier wave or other transmissive media, or other media.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 9A may be integrated into components, or may be subdivided into components. Moreover, the blocks of FIGS. 5A, 5B, 6, 7 and 8 represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
observing a data stream;
partitioning a cache into a first portion and a second portion in response to the observing the data stream;
maintaining the first portion;
maintaining the second portion; and
wherein maintaining the first portion includes:
reading a set of spans into the first portion;
writing to a span of the set of spans;
marking a span written to as a dirty span;
writing to a dirty span; and
marking a dirty span written to as a fully dirty span.

2. The method of claim 1 wherein:
maintaining the first portion further includes:
scrubbing the first portion, the scrubbing including writing back and removing fully dirty spans in LRU order, the scrubbing further including writing back and removing dirty spans in LRU order.

3. The method of claim 2 wherein:
maintaining the second portion includes:
writing to a span of the set of spans;
marking a span written to as a dirty span;
writing to a dirty span; and
marking a dirty span written to as a fully dirty span.

4. The method of claim 3 wherein:
maintaining the second portion further includes:
scrubbing the second portion, the scrubbing including writing back and removing fully dirty spans in LRU order, the scrubbing further including writing back and removing dirty spans in LRU order.

5. A medium embodying instructions, the instructions when executed by a processor causing the processor to perform a method, the method comprising:
observing a data stream;
partitioning a cache into a first portion and a second portion in response to the observing the data stream;
maintaining the first portion;
maintaining the second portion;
and wherein maintaining the first portion includes:
reading a set of spans into the first portion;
writing to a span of the set of spans;
marking a span written to as a dirty span;
writing to a dirty span;
marking a dirty span written to as a fully dirty span; and
scrubbing the first portion, the scrubbing including writing back and removing fully dirty spans in LRU order, the scrubbing further including writing back and removing dirty spans in LRU order.

6. A medium embodying instructions, the instructions when executed by a processor causing the processor to perform a method, the method comprising:
observing a data stream;
partitioning a cache into a first portion and a second portion in response to the observing the data stream;
maintaining the first portion;
maintaining the second portion;
and wherein maintaining the second portion includes:
writing to a span of the set of spans;
marking a span written to as a dirty span;
writing to a dirty span;
marking a dirty span written to as a fully dirty span; and
scrubbing the second portion, the scrubbing including writing back and removing fully dirty spans in LRU order, the scrubbing further including writing back and removing dirty spans in LRU order.

7. The medium of claim 6 further embodying instructions which when executed by a processor cause the processor to perform the method wherein:
maintaining the second portion includes:
reading a set of spans into the first portion;
writing to a span of the set of spans;
marking a span written to as a dirty span;
writing to a dirty span;
marking a dirty span written to as a fully dirty span; and
scrubbing the second portion, the scrubbing including writing back and removing fully dirty spans in LRU order, the scrubbing further including writing back and removing dirty spans in LRU order.

8. The method of claim 1 further comprising:
further observing the data stream
unifying the first portion and the second portion in response to the observing the data stream.

9. The method of claim 1 wherein:
the first portion has a size unequal to a size of the second portion.

10. The method of claim 1 wherein:
the first portion and the second portion have predetermined sizes.

11. The method of claim 10 wherein:
the first portion has a size equal to a size of the second portion.

12. The method of claim 10 wherein:
the first portion has a size unequal to a size of the second portion.

13. The method of claim 1 wherein:
the second portion is maintained independently of maintaining the first portion.

14. The method of claim 1 wherein:
the first portion is used to store graphics Z values; and
the second portion is used to store graphics color values.

15. The method of claim 14 wherein:
the first portion is read-allocated.

16. The method of claim 15 wherein:
the second portion is write-allocated.

17. The method of claim 16 wherein:
the second portion is smaller than the first portion.

18. The method of claim 15 wherein:
the second portion is read-allocated and
the second portion is of a size equal to a size of the first portion.

19. A system comprising:
a processor;
a control hub coupled to the processor;
a memory coupled to the control hub;
a graphics subsystem coupled to the control hub, the graphics subsystem having a cache, the internal structure of the cache dynamically reconfigurable into a first portion and a second portion in response to changes in a data stream received by the graphics subsystem, the first portion and the second portion maintainable independently, and wherein maintenance of the first portion includes reading a set of spans into the first portion, writing to a span of the set of spans, marking a span written to as a dirty span, writing to a dirty span, and marking a dirty span written to as a fully dirty span.

20. The system of claim 19 wherein:
maintenance of the first portion further includes scrubbing the first portion, the scrubbing including writing back and removing fully dirty spans in LRU order, the scrubbing further including writing back and removing dirty spans in LRU order.

21. The system of claim 20 wherein:

maintenance of the second portion includes writing to a span of the set of spans, marking a span written to as a dirty span, writing to a dirty span, marking a dirty span written to as a fully dirty span, and scrubbing the second portion, the scrubbing including writing back and removing fully dirty spans in LRU order, the scrubbing further including writing back and removing dirty spans in LRU order.

22. The system of claim 20 wherein:

the first portion is used to store graphics Z values; and the second portion is used to store graphics color values.

23. The system of claim 20 wherein:

the first portion is read-allocated.

24. The system of claim 23 wherein:

the second portion is write-allocated.

25. An apparatus comprising:

a cache suitable for coupling to a bus, the cache configurable in response to data received on the bus, the cache having a first and a second portion, the first portion configurable as independent of the second portion or unified with the second portion, the first portion expandable or collapsible within the cache, the first portion and the second portion maintainable independently, and wherein maintenance of the first portion includes reading a set of spans into the first portion, writing to a span of the set of spans, marking a span written to as a dirty span, writing to a dirty span, and marking a dirty span written to as a fully dirty span.

26. The apparatus of claim 25 wherein:

maintenance of the first portion further includes scrubbing the first portion, the scrubbing including writing back and removing fully dirty spans in LRU order, the scrubbing further including writing back and removing dirty spans in LRU order.

27. The apparatus of claim 25 wherein:

maintenance of the second portion includes writing to a span of the set of spans, marking a span written to as a dirty span, writing to a dirty span, marking a dirty span written to as a fully dirty span, and scrubbing the second portion, the scrubbing including writing back and removing fully dirty spans in LRU order, the scrubbing further including writing back and removing dirty spans in LRU order.

28. The apparatus of claim 25 wherein:

the first portion has a size unequal to a size of the second portion.

* * * * *